United States Patent [19]

Blankers

[11] Patent Number: 5,087,859
[45] Date of Patent: Feb. 11, 1992

[54] SWITCHING ARRANGEMENT FOR HIGH PRESSURE DISCHARGE LAMP

[75] Inventor: Hendrik J. Blankers, Eindhoven, Netherlands

[73] Assignee: U. S. Philips Corporation, New York, N.Y.

[21] Appl. No.: 522,437

[22] Filed: May 11, 1990

[30] Foreign Application Priority Data

May 17, 1989 [NL] Netherlands ............... 8901223

[51] Int. Cl.$^5$ ............................ H05B 41/36
[52] U.S. Cl. ............... 315/209 R; 315/219; 315/307; 315/DIG. 7
[58] Field of Search ............ 315/209 R, 200 R, 219, 315/220, 226, 224, 210, 212, 315, 307, DIG. 5, DIG. 7; 363/132; 307/254

[56] References Cited

U.S. PATENT DOCUMENTS

| | | | |
|---|---|---|---|
| 3,949,267 | 4/1976 | Collins | 315/DIG. 7 X |
| 4,400,651 | 8/1983 | Nelle | 315/209 R X |
| 4,471,269 | 9/1984 | Ganser et al. | 315/307 |
| 4,485,434 | 11/1984 | Beeston et al. | 315/DIG. 7 X |
| 4,649,321 | 3/1987 | Ferraro | 315/224 |
| 4,677,346 | 6/1987 | Roberts et al. | 315/226 |
| 4,763,239 | 8/1988 | Ball | 315/226 X |
| 4,939,381 | 7/1990 | Shibata et al. | 315/307 X |

Primary Examiner—Eugene R. Laroche
Assistant Examiner—Ali Neyzari

[57] ABSTRACT

The invention relates to a switching arrangement suitable for ignition and operation of a high-pressure discharge lamp by means of a plulsatory current of changing polarity. For this purpose, the switching arrangement is provided with a bridge network (II), which includes a switching means (21) switched alternately to the conducting and the non-conducting state. The switching means is provided with a control electrode (215) and a main electrode (211), between which a shortcircuit is maintained by means of a shortcircuit switch (27) for the time in which the switching means is in the non-conducting state. According to the invention, the shortcircuit switch is controlled by means of a controlled current source (28).

3 Claims, 1 Drawing Sheet

SWITCHING ARRANGEMENT FOR HIGH PRESSURE DISCHARGE LAMP

The invention relates to a switching arrangement suitable for ignition and operation of a high-pressure discharge lamp with a pulsatory current of changing polarity provided with a bridge network including a first switching means switched alternately to a conducting and to a non-conducting state for obtaining the pulsatory current of changing polarity, a driving circuit for driving the switching means including a shortcircuit switch between a control electrode and a main electrode of the switching means, which maintains for the time in which the switching means is switched to the non-conducting state a shortcircuit between the control electrode and the main electrode, and a control circuit for supplying a control signal to the driving circuit.

A switching arrangement of the kind mentioned in the opening paragraph is known from GB 2 102 641 A to which U.S. Pat. No. 4,485,434 corresponds.

Considerable voltage differences occur in a bridge network of the known switching arrangement. To prevent adverse effects of the prevailing voltage differences on the driving circuit, a D.C. separation is provided between the switching means and the driving circuit. Thus, in the known switching arrangement, the shortcircuit means in the form of a phototransistor at the same time constitutes a D.C. separation between the bridge network and the driving circuit. Such phototransistors have comparatively small dimensions and thus favour a comparatively compact construction of the switching arrangement. However, such phototransistors require a comparatively high control power.

Another possibility of D.C. separation is formed by a transformer. However, this involves the drawback that the dimensions are comparatively large already for transmission of low power.

The invention has for one of object to provide a measure by which reduction of control power can be obtained whilst maintaining a comparatively compact construction of the switching arrangement.

According to the invention, a switching arrangement of the kind mentioned in the opening paragraph is characterized in that the driving circuit comprises a controlled current source for controlling the shortcircuit switch. By extracting the control power for the shortcircuit switch from a controlled current source, a D.C. separation between the driving circuit and the bridge network is no longer necessary. This provides the possibility of using types of switches as shortcircuit switch which are operated with a comparatively low control power. A particularly suitable shortcircuit switch is a transistor which due to a usually comparatively large amplification factor can be switched with a comparatively low control power.

Preferably, a base electrode of the transistor is D.C.-connected to the controlled current source.

A controlled current source can be obtained in a comparatively simple manner by means of semiconductors and is in such a form particularly suitable for miniaturization, as a result of which a compact construction of the switching arrangement is at least maintained.

In an advantageous embodiment of the switching arrangement according to the invention, the controlled current source serves at the same time for controlling a semiconductor switch associated with a second switching means of the bridge network, which second switching means is switched in alternation with the first switching means to the conducting state. This favours a further miniaturization of the construction of the switching arrangement.

In a bridge network provided with four switching means which are switched pairwise alternately to the non-conducting state for obtaining the pulsatory current of changing polarity, from a viewpoint of a reliable operation of the switching arrangement it is advantageous to provide the switching means pairwise with a driving circuit.

It is known from U.S. Pat. No. 4,649,321 that voltage differences can be counteracted by ensuring that, when a switching means of the bridge network is made non-conducting through mutual shortcircuiting of the main electrode and control electrode of the relevant switching means, this main electrode and control electrode are shortcircuited only when the main electrode is at a low voltage. This is achieved in that two switching means, which are switched to the conducting state alternately, are in the conducting state simultaneously for some time for the purpose of polarity change of the generated square-wave current. It is true that it is possible in this way to limit the D.C. separation between the bridge network and the driving circuit to just a diode, but on the other hand this realization has the major disadvantage that the bridge network is in fact shortcircuited at each polarity change. In addition, a resistance element in the form of an incandescent coil connected in series wit the bridge network is required during this shortcircuit condition to prevent excessive currents through the switching means. This leads to undesirable power losses An embodiment or a switching arrangement according to the invention will be described with reference to a drawing. In the drawing:

Figure 1:
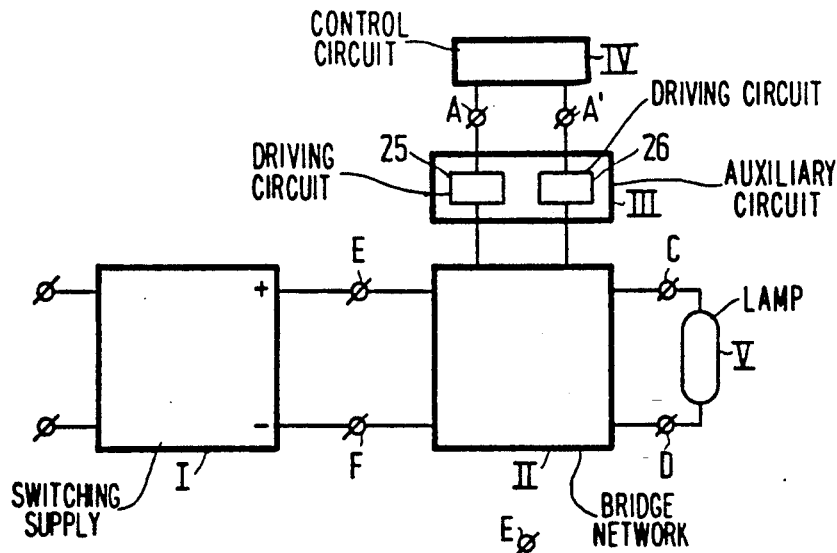
FIG. 1 shows a block circuit diagram of the switching arrangement.

The switching arrangement shown in FIG. 1 consists of a switching supply I, a bridge network II, an auxiliary circuit III and a control circuit IV. The auxiliary circuit III comprises two driving circuits 25, 26. A high-pressure discharge lamp V to be operated is connected to the bridge network II. In the present embodiment, this lamp is a high-pressure metal halide lamp having a nominal power of 200 W.

Figure 2:
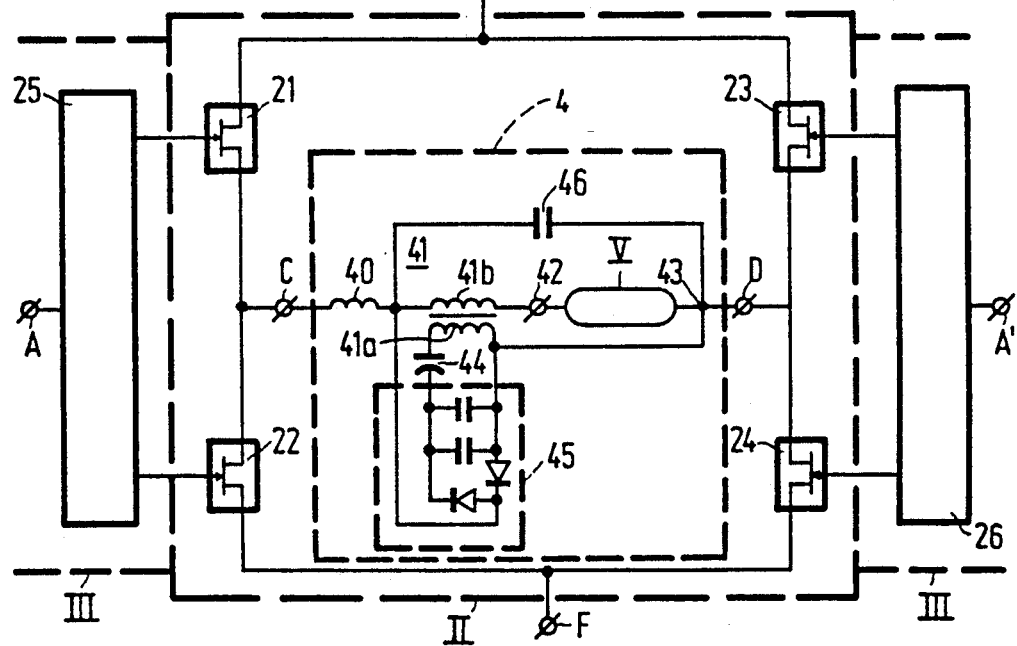
FIG. 2 shows a further elaboration of a bridge network of the switching arrangement.

The bridge network II and the auxiliary circuit III are shown in a further elaboration in FIG. 2. The bridge network comprises switching means 21, 22, 23, 24, which are switched pairwise alternately to a conducting and a non-conducting state for obtaining a pulsatory current of changing polarity through the lamp V.

The lamp V is included in a network 4, which is connected between connection points C and D of the bridge network. A circuit constituted by an inductor 40, a secondary winding 41*b* of a transformer 41 and lamp connection points 42, 43 forms part of the network 4. The secondary winding 41*b* and the lamp connection points 42, 43 are shunted by a capacitor 46. The primary winding 41*a* of the transformer 41 forms part of a circuit producing voltage pulses and provided with a gas-filled breakdown element 44 and a voltage-increasing network 45.

Figure 3:
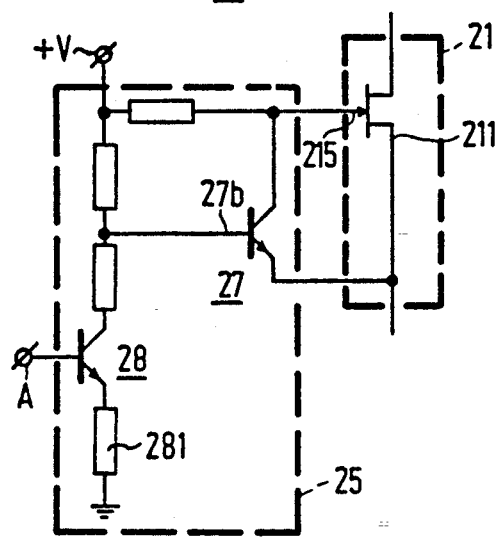
FIG. 3 shows a further elaboration of a driving circuit of the switching arrangement.

The switching means 21, 22, 23, 24 are driven pairwise by driving circuits 25, 26. The driving circuit 25 is shown in a further elaboration in FIG. 3. In this Figure, a shortcircuit switch 27 is connected between a control electrode 215 and a main electrode 211 of the switching means 21. The shortcircuit switch is in the form of a transistor, of which a base electrode 27b is D.C.-connected to a controlled current source 28 of the driving circuit. The controlled current source is controlled by means of a controlled signal supplied the control circuit at the connection A.

The controlled current source 28 and the shortcircuit switch 27 are supplied by way of an auxiliary voltage connection point +V.

The control signal supplied by the control circuit by way of the connection terminal A consists of a sequence of square-wave voltage pulses. In the presence of a square-wave pulse at A, the transistor in the controlled current source 28 is conducting and a current, defined by emitter 281, flows through the controlled current source from the auxiliary voltage connection point +V. As a result, the voltage at the base electrode 27b of the shortcircuit switch 27 is comparatively low, which results in that the shortcircuit switch is in the non-conducting state. As a result, the switching means 21 will be in the conducting state due to the auxiliary voltage present at the auxiliary voltage connection point +V.

As soon as the voltage pulse at A terminates, the transistor in the controlled current source 28 becomes non-conducting so that current no longer flows through the controlled current source. This results in that the voltage at the base electrode 27b of the shortcircuit switch 27 becomes comparatively high and the shortcircuit switch 27 becomes conducting. As a result, a shortcircuit between the control electrode 215 and the main electrode 211 of the switching means 21 is obtained, which is maintained until a next voltage pulse appears at A. Due to the shortcircuit, the switching means 21 remains in the non-conducting state.

The lamp is ignited in that the switching means of the bridge network II are switched at a high frequency. In the present embodiment, the high frequency is chosen to lie at about 55 kHz. The switching pulses are generated in known manner in the control circuit IV. The high frequency is chosen so that in the network 4 the inductor 40, the connected lamp and the capacitor 46 constitute a tuned oscillatory circuit. Thus, a high voltage is generated between the lamp connection points 42, 43, as a result of which breakdown will occur in the connected lamp V between the lamp electrodes. Due to the breakdown of the lamp, the oscillatory circuit loses its tuning.

In case the connected lamp does not break down at the voltages produced in the oscillatory circuit, in due course the voltage in the network 45 will have increased to such an extent that the gas-filled breakdown element 44 reaches its breakdown voltage and breaks down. The capacitors present in the network 45 are then discharged abruptly by way of the breakdown element 44 and the primary winding 41a of the transformer 41. As a result, a very high generated in the secondary winding 41b, which voltage is generated in the secondary winding 41b, which voltage also appears at the lamp connection point 42.

In the circuit arrangement described, the breakdown element 44 is chosen so that it has a breakdown voltage of 3 kV. A suitable choice of the winding ratio and the configuration of the transformer 41 on the one hand and a suitable tuning of capacitance values formed by the windings and electrical conductors to the capacitors present on the other hand results in the embodiment considered in a voltage peak at the lamp connection point 42 of 25 kV upon breakdown of the breakdown element 44.

By means of the circuit producing voltage pulses, which is constituted by the transformer 41, the breakdown element 44 and the network 45, it is possible to re-ignite a connected lamp substantially immediately after it has been switched off. This is generally designated as "hot re-ignition".

After the lamp has ignited, it reaches after some time a stable operating condition. After ignition of the lamp, the switching means of the bridge network are switched at a frequency of about 400 Hz. The lamp operated by means of the switching arrangement described has with constant power a luminous flux of substantially constant intensity and is therefore suitable to be used as a light source for projection purposes.

I claim:

1. A switching arrangement suitable for ignition and operation of a high-pressure discharge lamp with a pulsatory current of changing polarity provided with
    a bridge network including a first switching means switched alternately to a conducting and a non-conducting state for obtaining the pulsatory current of changing polarity,
    a driving circuit for driving the switching means, which includes a shortcircuit switch between a control electrode and a main electrode of the switching means, which maintains for the time in which the switching means is switched to the non-conducting state a shortcircuit between the control electrode and the main electrode, and
    a control circuit for supplying a control signal to the driving circuit,
characterized in that the driving circuit comprises a controlled current source for controlling the shortcircuit switch.

2. A switching arrangement as claimed in claim 1, characterized in that the shortcircuit switch is a transistor, of which a base electrode is D.C.-connected to the controlled source.

3. A switching arrangement as claimed in claim 1 or 2, characterized in that the controlled current source serves at the same time for controlling a shortcircuit switch associated with a second switching means of the bridge network, which second switching means is switched in alternation with the first switching means to the conducting state.

* * * * *